April 10, 1951 P. A. JONCAS 2,548,375
SWING
Filed Dec. 19, 1946 2 Sheets-Sheet 2
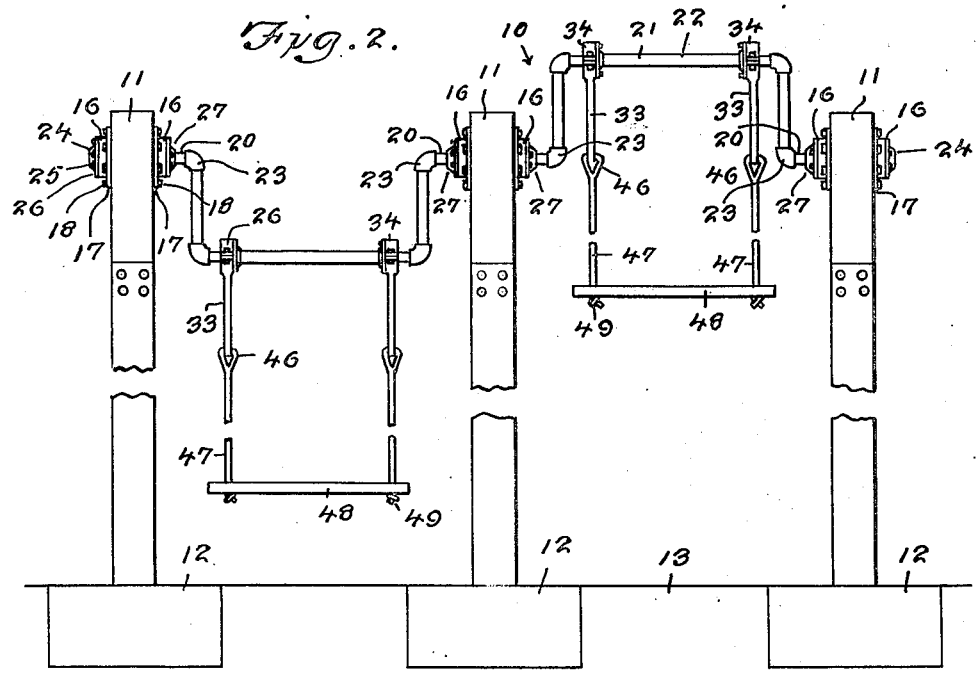
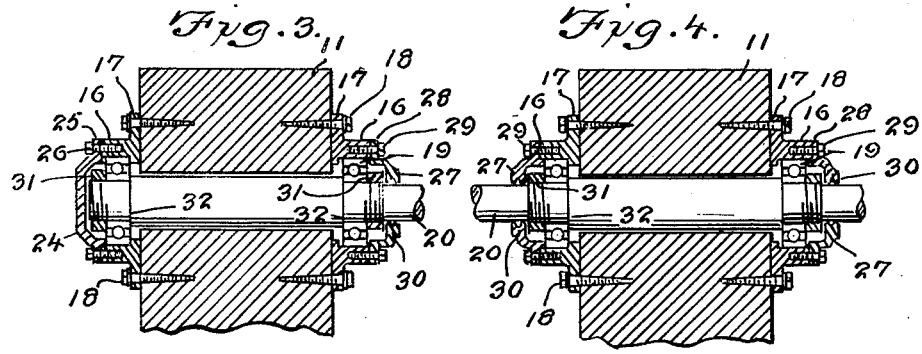
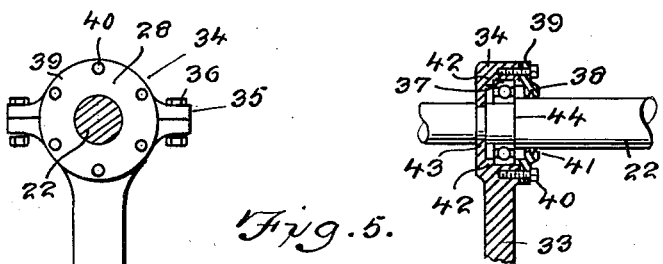
INVENTOR.
Phillip A. Joncas
BY Victor J. Evans & Co.
ATTORNEYS Patented Apr. 10, 1951

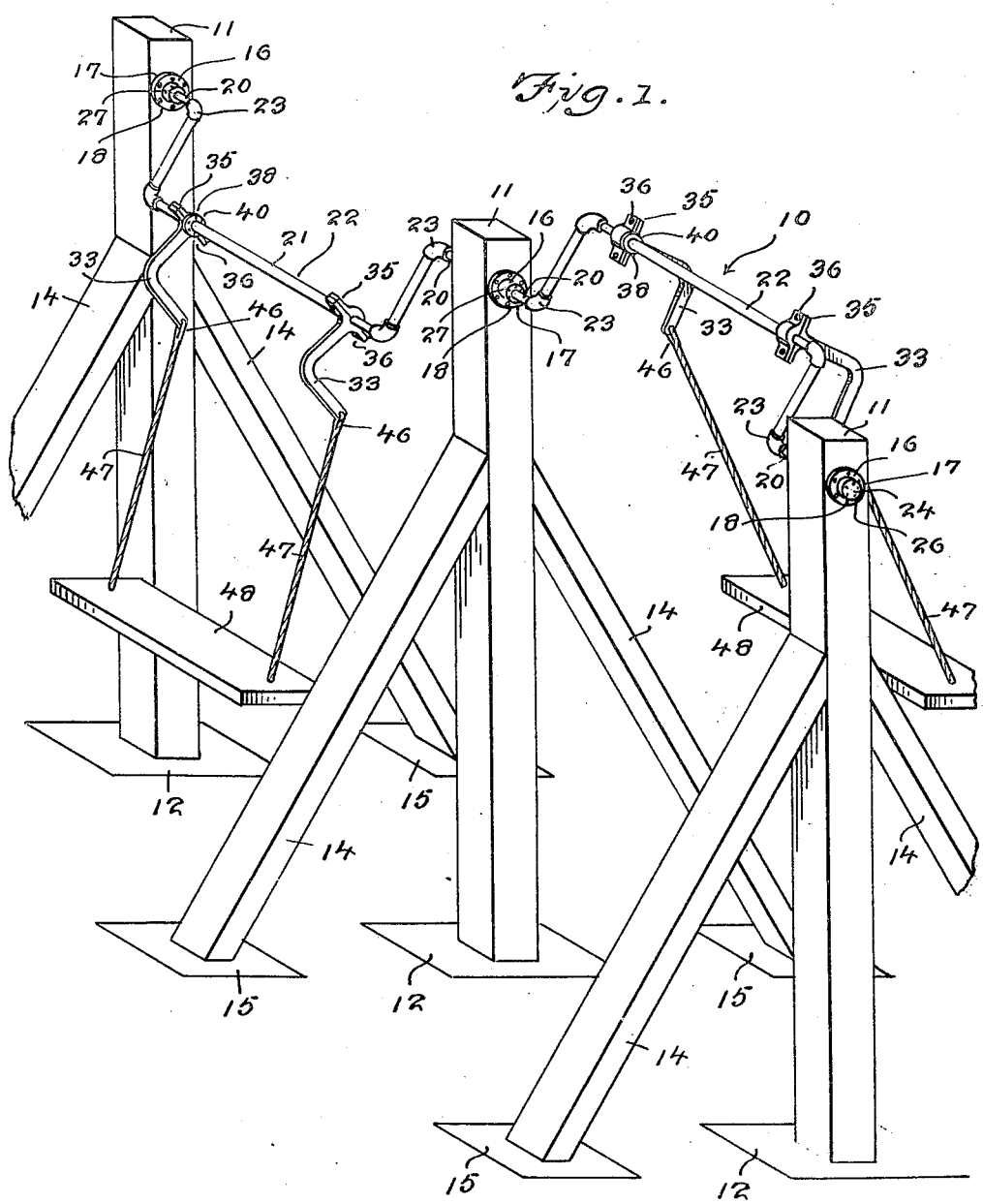

2,548,375

UNITED STATES PATENT OFFICE 2,548,375

SWING

Phillip A. Joncas, Hollywood, Calif.

Application December 19, 1946, Serial No. 717,303

2 Claims. (Cl. 155—58)

This invention relates to swings and the primary object of the invention is to provide a unique structure for the swing so that the occupant thereof is provided with an up and down as well as a back and forth motion in addition to the conventional swing motion of the swing.

An object of the invention is to provide a swing that gives a lift and then a drop motion to the occupant during the swinging motion, and the swing being operated by the change of weight and direction of swing of the occupant.

With the above and other objects and advantages in view, the invention consists of the novel details of construction, arrangement and combination of parts more fully hereinafter described, claimed and illustrated in the accompanying drawings in which:

Figure 1 is a perspective view of an embodiment of the invention;

Figure 2 is an elevational view partly broken away of the device;

Figure 3 is a transverse sectional view of the outer bearing supports;

Figure 4 is a transverse sectional view of the intermediate bearing support;

Figure 5 is an elevational view partly in section of the L-shaped link or supporting arm for the swing and Figure 6 is a sectional view of Figure 5 at the bearing end of the arm.

Referring more in detail to the drawings, the reference numeral 10 designates generally the swing which comprises a series of vertically disposed standards 11 which are set in blocks of concrete 12 which are embedded in the ground 13.

The standards are provided with angular braces 14 which extend downwardly in inclined relation to the standards in opposed relation to each other, to be set in concrete blocks 15 which are embedded in the ground 13.

Each of the standards is provided at the top on each of the opposite outer faces thereof with a bearing housing 16 having an annular flange 17 which is secured to the respective standard by means of screws 18. Mounted in each housing 16 are the ball bearings 19 in which are journalled the alining sections 20 of the crank-shaft 21. The crank-shaft is tubular in cross-section, and is provided with opposed cranks 22 which are connected to the sections 20 by elbows 23.

To protect the outer ball bearings 19, the housings are provided with caps 24 each having an annular flange 25 which is secured to a housing by bolts 26. The intermediate bearings 19 are protected by apertured caps 27 having an annular flange 28 secured to the housings by bolts 29, and gaskets 30 in the caps prevent moisture from entering the housings and retain the lubricant therein for the bearings.

Each of the sections 20 is provided with a bearing retainer 31 which is threadably mounted thereon, which retain the bearings 19 in proper position in their respective housings in abutment with the shoulders 32 formed on the sections 20.

The cranks are offset from each other to give a double throw to the swings during the swinging motion thereof.

The cranks have L-shaped links 33 rotatably mounted thereon by means of the bearing ends 34 thereon. The ends 34 are sectional, and provided with ears 35 which, secured by bolts 36, permit the mounting of the ends on the cranks, and bearings 37 in the ends 34 freely mount the L-shaped links 33 on the cranks 22. Apertured caps 38 having each an annular flange 39 are secured to the ends 34 by bolts 40, and gaskets 41 in the caps 35 prevent moisture from entering the housings and retain the lubricant for the bearings therein. The caps also retain the bearings in abutment with the shoulders 42 formed in the ends 34 and the ends being mounted in the grooves 43 in the cranks 22 retain the bearings in abutment with the shoulders 44 formed on the cranks 22.

The ends of the L-shaped links 33 opposite to the ends 34 are apertured at 45 to receive the looped ends 46 of the swing seat supporting ropes 47 which are secured at their opposite ends to the swing seats 48 by the conventional knots 49.

In operation, the occupants of the swing are given a motion by the throw of the cranks, and the various positions of the L-shaped links; thus an up and down motion is conveyed to the seats 48.

It is believed that from the foregoing description, the operation and construction of the invention will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described, comprising vertically positioned relatively spaced supports, bearings in the upper ends of said supports, a shaft having opposed cranks therein and journailed in said bearings, L-shaped links secured to said cranks and swing supporting ropes secured to said L-shaped links the offset cranks giving an up and down movement to said supporting ropes during the swinging movement of said swing.

2. The invention as in claim 1 wherein each of said L-shaped links is provided with a bearing at the end secured to the crank and each bearing rotatably secures its respective end on said cranks and a seat is attached to the lower ends of said ropes.

PHILLIP A. JONCAS.

REFERENCES CITED

The following references are of record in the file of this patent:

UNITED STATES PATENTS

| Number | Name | Date |
|---|---|---|
| 473,168 | Smith | Apr. 19, 1892 |
| 1,481,734 | Paxson | Jan. 22, 1924 |
| 1,687,408 | Watkins | Oct. 9, 1928 |

FOREIGN PATENTS

| Number | Country | Date |
|---|---|---|
| 68,361 | Austria | of 1915 |